United States Patent
Chandler

(10) Patent No.: US 9,803,922 B2
(45) Date of Patent: Oct. 31, 2017

(54) SYSTEM AND METHOD FOR MELTING LIGHT GAUGE SCRAP

(71) Applicants: Altek L.L.C., Exton, PA (US); Altek Europe Ltd, Derbyshire (GB)

(72) Inventor: Richard C Chandler, Solon, OH (US)

(73) Assignees: Altek L.L.C., Exton, PA (US); Altek Europe Ltd., Derbyshire (GB)

( * ) Notice: Subject to any disclaimer, the term of this patent is extended or adjusted under 35 U.S.C. 154(b) by 448 days.

(21) Appl. No.: 14/273,717

(22) Filed: May 9, 2014

(65) Prior Publication Data
US 2015/0323255 A1   Nov. 12, 2015

(51) Int. Cl.
| | |
|---|---|
| F27B 3/19 | (2006.01) |
| F27B 3/18 | (2006.01) |
| C22B 9/16 | (2006.01) |
| F27B 3/04 | (2006.01) |
| C22B 7/00 | (2006.01) |
| C22B 21/00 | (2006.01) |

(Continued)

(52) U.S. Cl.
CPC .............. *F27B 3/19* (2013.01); *C22B 7/003* (2013.01); *C22B 9/16* (2013.01); *C22B 21/0092* (2013.01); *F27B 3/045* (2013.01); *F27B 3/10* (2013.01); *F27B 3/18* (2013.01); *F27D 27/00* (2013.01); *Y02P 10/218* (2015.11)

(58) Field of Classification Search
CPC ....... C22B 21/0092; C22B 7/003; C22B 9/16; F27B 3/045; F27B 3/10; F27B 3/18; F27B 3/19; F27D 27/00; Y02P 10/218
USPC .......... 75/687, 581; 222/591, 590; 266/235, 266/236, 239, 275, 216, 200, 900, 901
See application file for complete search history.

(56) References Cited

U.S. PATENT DOCUMENTS

| | | |
|---|---|---|
| 3,272,619 A | 9/1966 | Sweeney et al. |
| 3,997,336 A | 12/1976 | van Linden et al. |

(Continued)

FOREIGN PATENT DOCUMENTS

| | | |
|---|---|---|
| EP | 0 168 250 | 1/1986 |
| WO | 2010058172 | 5/2010 |
| WO | 2013158607 | 10/2013 |

OTHER PUBLICATIONS

International Search Report and Written Opinion (ISR/WO) for International Application No. PCT/US2015/028275 dated Jul. 17, 2015.

*Primary Examiner* — Scott Kastler
*Assistant Examiner* — Michael Aboagye
(74) *Attorney, Agent, or Firm* — Tucker Ellis LLP

(57) ABSTRACT

An exemplary furnace system for melting stock metal includes a main hearth and a side well subsystem, which includes a melting well disposed downstream of the main hearth for receiving flow from the main hearth, an input flow inducer disposed upstream of the melting well and downstream of the main hearth, and an output flow inducer disposed downstream of the melting well and upstream of the main hearth. The input flow inducer drives molten metal into the melting well, thereby forming a differential metal head in the melting well. The output flow inducer evacuates molten metal from an output conduit, thereby reducing counter-pressure at an output port of the melting well communicating with the output conduit. This allows atmospheric pressure to add to the differential metal head in the melting well, resulting in an increase in productivity of the side well subsystem and of the furnace system as a whole.

18 Claims, 4 Drawing Sheets

(51) Int. Cl.
*F27B 3/10* (2006.01)
*F27D 27/00* (2010.01)

(56) References Cited

U.S. PATENT DOCUMENTS

| | | |
|---|---|---|
| 4,286,985 A | 9/1981 | van Linden et al. |
| 5,863,314 A | 1/1999 | Morando |
| 6,036,745 A | 3/2000 | Gilbert et al. |
| 6,074,455 A | 6/2000 | Van Linden et al. |
| 6,217,823 B1 * | 4/2001 | Vild ................ C22B 7/003 266/216 |
| 7,556,766 B2 | 7/2009 | Yu et al. |
| 2007/0057419 A1 | 3/2007 | Peel et al. |
| 2007/0108673 A1 * | 5/2007 | Peel ................ C21C 7/0006 266/233 |
| 2011/0133374 A1 * | 6/2011 | Cooper ............ C22B 7/003 266/200 |

* cited by examiner

SYSTEM AND METHOD FOR MELTING LIGHT GAUGE SCRAP

TECHNICAL FIELD

The technology of the present disclosure relates generally to melting pieces of metal stock and, more particularly, to a reverberatory furnace system for melting light gauge aluminum stock with improved throughput.

BACKGROUND

The production, processing, and recycling of aluminum commonly requires melting aluminum stock, such as scrap stock, that has a high surface area to weight ratio (also referred to as light gauge stock). Examples of such material include scalper chips generated from milling rolling ingots, turnings or swarf from lathe or sawing operations, and output from crushers or shredders used to recycle aluminum sheet, extrusions, or cast shapes. The material is typically melted in a melting chamber of a melting furnace, also referred to as a furnace system, such as a rotary furnace or a reverb furnace. It is desirable to submerge solid aluminum pieces quickly in a molten metal bath to reduce oxidation of the aluminum caused by contact of aluminum surfaces with air and accelerated by high temperatures. One conventional technique for submerging the aluminum scrap includes pushing the light gauge scrap under the surface of the molten metal. Another technique includes creating flow to a melting well to drag scrap under the surface of the molten metal bath.

Light gauge aluminum scrap is intrinsically difficult to efficiently melt because aluminum and its alloys oxidize very readily. The process of oxidation turns the surface from aluminum, a valuable metal, to aluminum oxide, a non-metallic mineral of comparatively lower value. Unprotected aluminum surfaces oxidize rapidly in air, even at ambient temperatures. When exposed to temperatures high enough to melt aluminum, the oxidation process is greatly accelerated. Thus, if aluminum is exposed to air at such temperatures, oxidation can completely consume aluminum having thin cross sections, that is, aluminum with a high surface area to weight ratio.

One historical technique for melting light gauge scrap is to use a rotary salt bath furnace. Rotary furnaces are capable of melting a wide variety of scrap types. Due to operational and environmental concerns, this technique is increasingly focused on processing aluminum dross.

Rotary furnaces are progressively being replaced by aluminum reverberatory furnace systems, also referred to as reverb furnaces or reverb furnace systems, for melting light gauge scrap. A typical reverb furnace system includes a heated hearth and a side well subsystem, which may include one or more side wells, such as a pumping well, a melting well, a dross skimming well, etc. When using a reverb furnace for scrap melting, it is standard practice to leave a molten metal "heel" in the furnace, and to use this reservoir of metal as the proximate heat source for melting the scrap. Heavier gauge scrap tends to quickly submerge in the molten metal and melt using the superheat in the molten metal. The molten metal bath effectively excludes air, which enables submerged melting to occur without excessive oxidation. This operation usually takes place not in the heated hearth of the reverb furnace, but in a side well located adjacent the hearth, which communicates with the hearth by means of submerged arches. In contrast to the heavier gauge scrap, light gauge scrap tends to float rather than sink. Thus, a technique or subsystem is sometimes employed to submerge the light gauge scrap into a side well bath of the side well subsystem to melt the scrap. An exemplary technique is to submerge the scrap using a turbulent flow in a melting well.

Because only the hearth is typically heated, the side well bath can quickly be chilled to the relative freezing point in the localized melting zone if the heat is not replaced by hot molten metal continuously circulating into and out of the melting zone. An inducer disposed upstream of a melting well where melting takes place is often used to circulate hot molten metal into the melting well.

An exemplary conventional system of this nature, that has been put into commercial use, is generally disclosed in U.S. Pat. No. 4,286,985. Another commercialized version of this type of system has a pump that supplies molten metal to a melting well via a single enclosed molten metal flow path. These types of conventional configurations and other similar systems all rely on a differential head or the column of molten metal vertically disposed between the elevated metal level in the melting well and the current metal level in the hearth and/or a pumping well to force molten metal downstream of the melting well. Therefore, the differential head dictates flow of molten metal out of the melting well, generally without regard to the physical configuration of the melting well.

SUMMARY OF INVENTION

Conventional reverb furnace light gauge scrap melting arrangements ("arrangements") limit circulation throughout the entire furnace due to reliance on differential head to move molten metal from the melting well and back to the hearth. Applicant has found that a general issue affecting flow throughout of the furnace system is that conventional arrangements slow the velocity and/or reduce the flow rate of molten metal once it is pumped into the melting well by an input flow inducer (e.g., a pump). The pump may have the capability to move molten metal at a flow rate and velocity adequate to penetrate and stir the bath in the furnace so as to cause a general bath circulation. But these flow rate and velocity capabilities are not transferred to the rest of the arrangement and do not carry further downstream of the melting well with sufficient energy. Note that kinetic energy is a function of the mass of the moving metal times the square of its velocity. Thus, an arrangement that greatly reduces the velocity of a pumped or circulated stream will greatly diminish its kinetic energy, as does an arrangement that limits the output of the pump below its capabilities. As a result, the ability to circulate a molten bath within the entire furnace is reduced. This in turn directly limits the production rate that the furnace can achieve.

To address these issues realized by the Applicant, disclosed is a furnace system for melting stock metal that is typically, but not necessarily, in the form of pieces of light gauge scrap aluminum. The furnace system includes a main hearth and a side well subsystem, which has a melting well downstream of the main hearth for receiving flow from the main hearth, and an output flow inducer downstream of the melting well and upstream of the main hearth. The output flow inducer forcibly directs flow downstream of the melting well through an output conduit to evacuate molten metal from the output conduit. This reduces counter-pressure at an output port of the melting well leading into the output conduit, and thereby allows atmospheric pressure to add to a differential metal head disposed in the melting well. This results in an increase in productivity of the furnace system.

According to one aspect, a furnace system for melting aluminum includes a reservoir for a molten metal bath, an input flow inducer, and a melting well. The melting well is configured to receive molten metal from the reservoir at an input port of the melting well under motive force applied to the molten metal by the input flow inducer. The melting well is further configured to receive solid metal pieces, the solid metal pieces at least partially melting in the molten metal in the melting well. The melting well has an output port through which molten metal exits the melting well. The furnace system further includes an output flow conduit fluidly coupled to the melting well at the output port, and an output flow inducer configured to apply motive force to the molten metal in the output flow conduit.

The output flow inducer may evacuate the output flow conduit.

A resulting pressure causing flow in the output conduit may be a function of atmospheric pressure on the molten metal in the melting well and of a differential head of metal in the melting well established by a differential height of the metal in the melting well and in the reservoir.

The output flow inducer may reduce counter-pressure at the output port of the melting well.

The reservoir may be at least one of a main hearth of the system in which heat energy is added to the molten metal or a pumping well at which the motive force is applied by the input flow inducer.

The input and output flow inducers may be controllable to vary flow rate of molten metal in the furnace system.

The output flow inducer may comprise an electromagnetic induction device.

The output flow inducer may comprise at least one of a mechanical pump, a permanent magnet device, or gas jets.

The input flow inducer may comprise at least one of an electromagnetic induction device, a mechanical pump, a permanent magnet device, or gas jets.

The metal bath may include aluminum, and the melting well may be configured to receive solid metal pieces including aluminum.

According to another aspect, a method of melting aluminum metal in a furnace system includes the steps of supplying a reservoir of molten metal, forcibly directing molten metal from the reservoir into a melting well, adding pieces of solid aluminum to the melting well, the pieces melting in the molten metal in the melting well, molten metal allowed to flow out of the melting well via an output conduit fluidly coupled to the melting well at an output port, and forcibly evacuating molten metal from the output conduit using an output flow inducer configured to apply motive force to the molten metal in the output flow conduit.

A resulting pressure causing flow in the output conduit may be a function of atmospheric pressure on the molten metal in the melting well and of a differential head of metal in the melting well established by a differential height of the metal in the melting well and in the reservoir.

Forcibly evacuating molten metal from the output conduit may include electromagnetically exciting the molten metal.

Forcibly evacuating molten metal from the output conduit may include mechanically acting on the molten metal or directing gas at the molten metal.

Forcibly evacuating molten metal from the output conduit may include magnetically driving the molten metal.

The output flow inducer may reduce counter-pressure at the output port of the melting well.

The molten metal reservoir may be fluidly coupled to a main hearth of the system in which heat energy is added to the molten metal.

The flow rate of molten metal in the furnace system may be controllable.

Adding pieces of solid metal to the melting well may include adding pieces of solid metal including aluminum.

Supplying a reservoir of molten metal may include supplying a reservoir of molten metal including aluminum.

According to yet another aspect, a furnace system for melting metal may include a reservoir for a molten metal bath, a side well configured to receive molten metal from the reservoir at an input port of the side well, the side well further configured to receive solid metal pieces, the solid metal pieces at least partially melting in the molten metal in the side well, the side well having an output port through which molten metal exits the side well and flows toward the reservoir, an output flow conduit fluidly coupled to the side well at the output port, and an output flow inducer configured to reduce counter-pressure at the output port by evacuation of molten metal from the output flow conduit allowing atmospheric pressure to drive a molten metal flow from the side well via the output flow conduit.

The output flow conduit may provide a path for molten metal from the side well directly to the reservoir.

The furnace system may further include an input flow conduit fluidly coupled between the side well and the reservoir, wherein the input flow conduit provides a path for molten metal from the reservoir directly to the side well.

The reservoir may be a main hearth of the system in which heat energy is added to the molten metal.

The output flow inducer may be further configured to reduce counter-pressure on a cross-sectional area of the output flow conduit, the cross-sectional area being transverse to the direction of flow through the output flow conduit.

The cross-sectional area of the output flow conduit may be a reduced area as compared to a cross-sectional area through the input flow conduit transverse a direction of flow through the input flow conduit.

The output flow inducer may have an operative component for providing a motive force to molten metal in the output flow conduit, and wherein the operative component is located adjacent the cross-sectional area.

The output flow conduit may be submerged below a height of molten metal in each of the side well and the reservoir.

The input flow conduit may be submerged below a height of molten metal in each of the side well and the reservoir.

DETAILED DESCRIPTION

Figure 1:
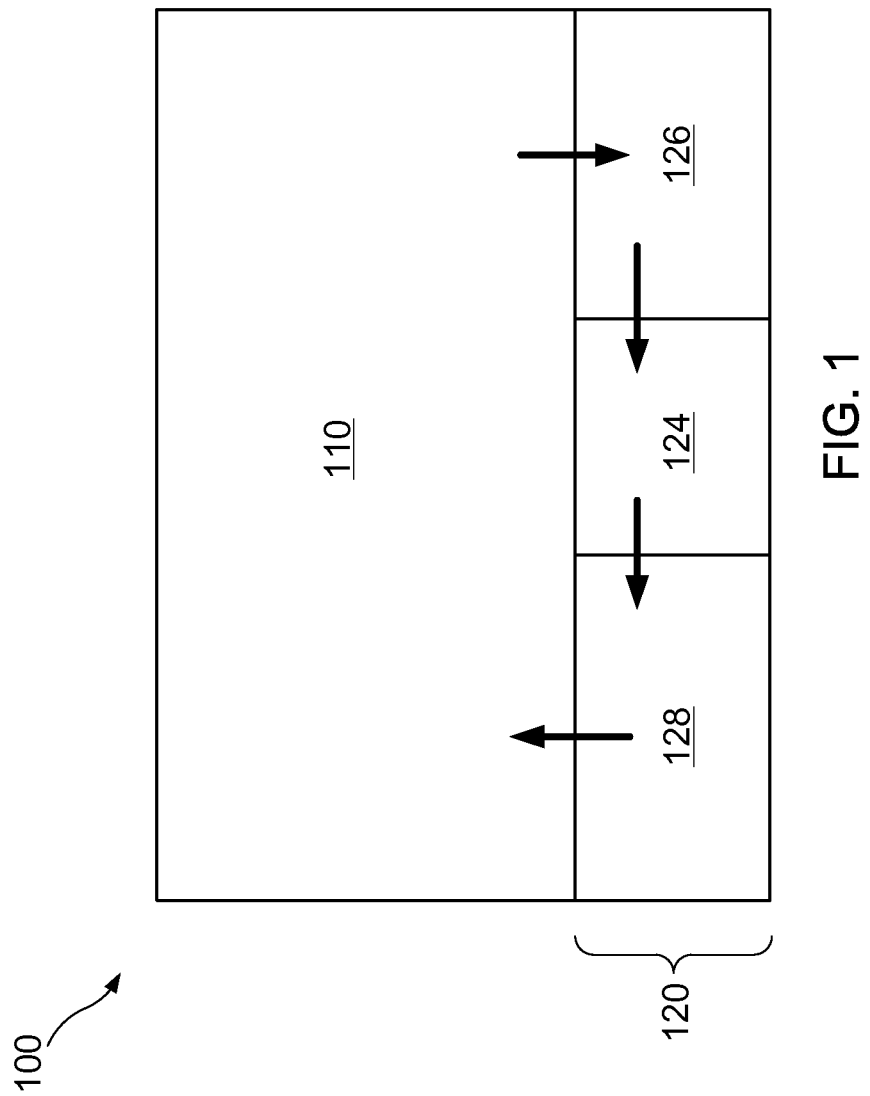
FIG. 1 is a schematic block diagram of an exemplary reverberatory furnace system.

Embodiments will now be described with reference to the drawings, wherein like reference numerals are used to refer to like elements throughout. It will be understood that the figures are not necessarily to scale. Features that are described and/or illustrated with respect to one embodiment may be used in the same way or in a similar way in one or more other embodiments and/or in combination with or instead of the features of the other embodiments.

Figure 2:
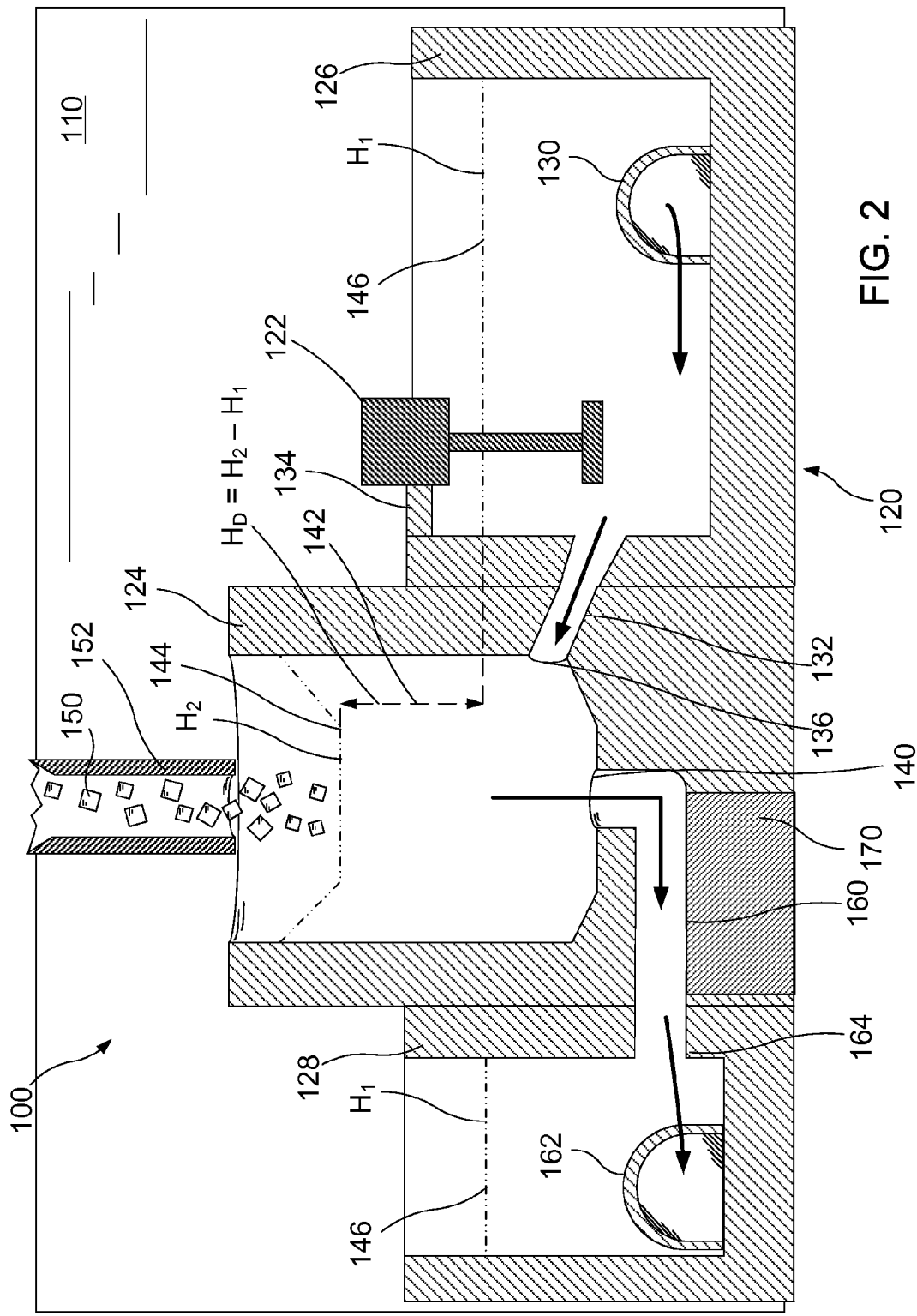
FIG. 2 is a partial front elevational view of the exemplary reverberatory furnace system of FIG. 1 that is shown in cross-section through a side well subsystem of the furnace system.

Referring to FIGS. 1 and 2, an exemplary reverberatory furnace system 100 is shown that provides advantages over conventional furnace systems. Generally, the exemplary furnace system 100 includes a main hearth 110 and a side well subsystem 120 that are used in the melting or recovery of metal stock. Preferably, the metal stock is aluminum or other non-ferrous metal. Typically, but not always, the metal stock is made up of pieces of light gauge aluminum or other metal (e.g., zinc, brass, or magnesium), which may be scrap derived from recycling efforts or industrial processes.

The side well subsystem 120 may include a melting well 124, a pumping well 126, and a dross skimming well 128. Molten metal is heated in a main hearth 110, circulated into the pumping well 126, and circulated into the melting well 124 where molten metal is mixed with solid metal (e.g., light gauge scrap aluminum) to melt the solid metal in the melting well 124. The molten metal, and potentially some still solid pieces of metal, are evacuated from the melting well 124 and enter the dross skimming well 128. From the dross skimming well 128, the molten metal is circulated back to the hearth 110. In one embodiment, the molten metal is evacuated from the melting well 124 to the hearth without flowing through an intermediate well. Similarly, circulation of molten metal from the hearth 110 to the melting well 124 may not be through an intermediate well, such as pumping well 126.

The molten metal in the hearth 110, pumping well 126 and dross skimming well 128 may be considered a molten metal "heel" or reservoir of molten metal. Typically, an upper surface of the reservoir of molten metal in each of these chambers has the same elevation. As will be described, an elevation of an upper surface of the metal in the melting well 124 is higher than the elevation of the upper surface of the reservoir of molten metal in the other chambers.

Turning specifically to FIG. 2, shown is a cross-section taken through the side well subsystem 120 of the furnace system 100. The main hearth 110 is disposed adjacent the side well subsystem 120. The main hearth 110 is heated and may, but not necessarily, provide heat through its walls to the adjacent side well subsystem 120. For example, one or more of the illustrated wells 124, 126, or 128 may share a wall with the hearth 110 through which heat energy from the hearth 110 is conducted into the wells 124, 126, and 128, thereby enhancing heating of molten metal within the wells 124, 126, and 128. The wells 124, 126, and 128 do not typically include their own heating source, although they could include their own heating source in other embodiments. The shared wall and/or walls of the wells 124, 126, and 128 may be made from refractory brick or cast refractory material.

In use, molten metal flows from the main hearth 110 into the pumping well 126 via a submerged arch 130 or other transfer conduit. The arch 130 fluidly connects the main hearth 110 and the side well subsystem 120, and is disposed downstream of the main hearth 110 and upstream of the side well subsystem 120. Molten metal is circulated into the side well subsystem 120 from the main hearth 110 by convection current and/or via forced convection between the main hearth 110 and the side well subsystem 120. With reference to circulation of molten metal through the furnace system 100, the pumping well 126 of the side well subsystem 120 is disposed upstream of the melting well 124 of the side well subsystem 120 and downstream of the main hearth 110. The pumping well 126 may be open to the environment, or the pumping well 126 may include a cover, such as a hood, enclosing the bath disposed therein. Such a cover may be configured to collect gases from the pumping well 126 and/or from the melting well 124 or dross skimming well 128.

An input flow inducer 122 is disposed in the pumping well 126 downstream of the hearth 110 and upstream of the melting well 124. The input flow inducer 122 directs flow of metal through an input flow conduit 132 that fluidly connects the pumping well and the melting well 124 so that the molten metal is directed into the melting well 124. The input flow inducer 122 may also accomplish general circulation of molten metal through the furnace system (e.g., from the main hearth 110 to the pumping well 126). In one embodiment, the input flow inducer 122 may be a metal pump, or as illustrated, a molten metal circulating impeller device. In other embodiments, the input flow inducer 122 may be an electromagnetic induction device (e.g., an electromagnetic stirrer, or an air or water-cooled electromagnetic pump or circulator), a mechanical pump (e.g., powered by an electric, hydraulic, or pneumatic motor), a permanent magnet device, gas jets, or any other device suitable for inducing sufficient flow of molten metal into the melting well 124. In one embodiment, more than one input flow inducer 122 may be present upstream of the melting well 124.

The input flow inducer 122 may be coupled to an exterior of the pumping well 126 or, as shown, disposed at least partially within pumping well 126. The input flow inducer 122 may be coupled to a wall of the pumping well 126 by a support arm 134 or by any other suitable structure. Alternatively, the input flow inducer 122 may be disposed adjacent the input conduit 132 and may be exterior to the input conduit 132, interior to the input conduit 132, or some combination thereof.

Flow moving through the input conduit 132 enters the melting well 124 through an orifice, such as an input port 136 of the melting well 124. The input conduit 132 fluidly connects the melting well 124 and the pumping well 126. The input conduit 132 is disposed downstream of the main hearth 110 and upstream of the melting well 124. The input flow conduit 132 may be a cylindrical tube or a shaped conduit of any suitable configuration with a predetermined cross-sectional area, which need not be constant over the length of the input flow conduit 132. Flow entering the melting well 124 at the input port 136 is under motive force applied to the molten metal by the input flow inducer 122.

As shown, the melting well 124 is disposed downstream of the main hearth 110 for receiving flow from the main hearth 110. The interior of the melting well 124 is often bowl-shaped or frustoconical in shape, although the interior may have any other suitable shape. The melting well 124 may be open to the environment, although the melting well 124 may instead be at least partially closed by a cover, such as a hood. Such a cover may be configured to collect gases from the melting well 124. The input port 136 enables flow into the melting well 124, while another orifice, such as an output port 140, enables flow out of the melting well 124. The output port 140 is illustrated at the lowermost point of the melting well 124, and below a minimum operating fluid level in a well located upstream of the melting well 124, such as the main hearth 110 or the pumping well 126. Thus, gravitational forces may act on fluid flowing out of the melting well 124 through the output port 140. In other embodiments, the output port 140 may be located at any other suitable location of the melting well 124.

The melting well 124 may include walls having comparatively greater height than walls of the pumping well 126 and/or dross skimming well 128. In this way, a molten metal column in the melting well 124, represented by reference 142, may obtain a greater maximum height than a height of metal in the pumping well 126, skimming well 128, and/or main hearth 110. Particularly, the metal transfer between the pumping well 126 and the melting well 124 via the input conduit 132 may be made at a sufficient rate and pressure to create a metal level 144 of the metal head $H_2$ in the melting well 124 that is comparatively higher than a metal level 146 of the metal head $H_1$ in the pumping well 126 and the dross skimming well 128. This relationship produces a differential metal head $H_D$ in the melting well 124. The input flow generated by the input flow inducer 122, entrance configuration of the input port 136, shape of the melting well 124, and/or configuration of the output port 140 establishes a vortex or other turbulent flow pattern within the melting well 124 to melt and incorporate light gauge scrap 150 into the molten metal flow stream. The light gauge scrap 150 may be deposited or charged into the melting well 124 via a scrap tube 152 or via any other suitable scrap transfer system.

An output flow conduit 160 extends between output 140 and the dross skimming well 128. More specifically, the output flow conduit 160 communicates with the melting well 124 at the output port 140 and defines a flow pathway that allows the flow of metal from the melting well 124 to the dross skimming well 128 and eventually to the main hearth 110. The output flow conduit 160 may be a cylindrical tube or a shaped conduit of any suitable configuration with a predetermined cross-sectional area, which need not be constant over the length of the output flow conduit 160. The output flow conduit 160 is disposed downstream of the melting well 124 and upstream of the skimming well 128 and the main hearth 110, and thus fluidly connects the melting well 124 and the main hearth 110 and/or the skimming well 128. A discharge opening 164 of the output flow conduit 160 communicates with the dross skimming well 128 so that molten metal evacuated from the melting well 124 via the output flow conduit 160 enters the molten metal within the dross skimming well 128 below the upper surface of the molten metal bath in the dross skimming well 128 (e.g., the discharge opening 164 is below the level 146) to eliminate or at least minimize cascading of the molten metal.

The skimming well 128 establishes a location downstream of the melting well 124 for charging heavier gauge scrap and/or for skimming off dross that floats to the surface of the molten metal. In other embodiments, the side well subsystem 120 may not include a skimming well 128. The skimming well 128 is disposed downstream of the melting well 124 and upstream of the main hearth 110, and is fluidly connected to the main hearth 110 via a submerged arch 162 or other transfer conduit. The arch 162 is thus disposed upstream of the main hearth 110 and downstream of the melting well 124 and of the skimming well 128.

Upstream of the skimming well 128 and of the main hearth 110, the side well subsystem 120 also includes an output flow inducer 170 for forcibly directing flow downstream of the melting well 124. This action is accomplished because the output flow inducer 170 is configured to act on the molten metal within the output flow conduit 160, applying motive force to the molten metal in the output flow conduit 160. Particularly, the output flow inducer 170 is configured to forcibly direct flow through the output conduit 160 in a downstream direction towards the main hearth 110. As a result, molten metal is evacuated out of the output conduit 160 by an evacuating action. The output flow inducer 170 acts on the molten metal in the output flow conduit 160 between the output port 140 and the discharge opening 164, where the cross-sectional area of the flow path is constricted by the defined size of the output flow conduit 160. The output flow inducer 170 may act on a whole cross-sectional area of the output flow conduit 160, and such action may have an effect on all or part of the volume of molten metal in the output flow conduit 160.

The output flow inducer 170 is disposed downstream of the melting well 124 and also upstream of the main hearth 110. As shown, the output flow inducer 170 is disposed adjacent the output conduit 160, although in other embodiments the output flow inducer 170 may be adjacent the melting well 124. The output flow inducer 170 is further disposed exterior to the output conduit 160, although it may be disposed at least partially in the output conduit 160 in other embodiments.

The output flow inducer 170 may be an electromagnetic induction device (e.g., an electromagnetic stirrer, or an air or water-cooled electromagnetic pump or circulator) as illustrated. Alternatively, the output flow inducer 170 may be any other suitable device for forcibly evacuating molten metal from the output conduit 160, such as a mechanical pump (e.g., powered by an electric, hydraulic, or pneumatic motor), a permanent magnet pump, gas jets, or other device that generates sufficient flow of molten metal. In some embodiments, more than one output flow inducer 170 may be present to act on the molten metal in the output flow conduit 160.

In one embodiment, the induced flow rate(s) of the molten metal at various locations in the system 100 may be regulated or varied by controlling the speed of operation of the output flow inducer 170 and/or the input flow inducer 122. Therefore, the throughput of metal recovery from the system may be varied and/or variations in flow may be made to accommodate various scrap feeding rates or various types of scrap. Molten metal may be tapped or recovered from the system 100 at any suitable point, such as from hearth 110, the pumping well 136 or the dross skimming well 128.

In operation of the exemplary side well subsystem 120, the input flow inducer 122 is supplied molten metal through the arch 130 from the main hearth 110 and pumps the molten metal through the pumping well 126 and into the melting well 124 through the input port 136 via the input conduit 132. The flow and pressure created by the input flow inducer 122 generates the differential metal head $H_D$ in the melting well 124. Metal is directed out of the melting well 124 through the output port 140 opening to the output conduit 160. Molten metal in the output conduit 160 is electromagnetically excited, magnetically driven, mechanically acted on (e.g., with a pump component or a stream of gas directed at the molten metal), and/or otherwise forcibly directed through the output conduit 160 by the output flow inducer 170 to evacuate the output flow conduit 160. The metal then flows through discharge opening 164 into the skimming well 128, and through arch 162, flowing back into the main hearth 110 of the furnace system 100 and away from the side well subsystem 120.

The exemplary side well subsystem 120, including the output flow inducer 170, provides advantages over conventional side well subsystems for use with reverb furnace systems, including conventional furnace systems employed to submerge and melt light gauge scrap metal. With reference to conventional reverb side well subsystems, an operating differential head in the melting well is conventionally limited by the practical height to which the melting well can be designed and constructed. In the industry, the resultant conventional differential head has a conventional practical limit of from 2 ft to 3.5 ft. The operating differential head in the melting well is also conventionally limited by the metal head in the main hearth, dross skimming well and/or pumping well, which opposes and balances the differential head in the melting well.

The resultant conventional differential head—the difference in height between the metal level in the hearth/pumping well and the metal level in the melting well—is the main controlling factor for the velocity and/or flow rate of molten metal exiting the melting well. The relationship between the differential head and the velocity/flow rate of metal exiting the melting well limits circulation in the main hearth downstream of the melting well to a level less than what one skilled in the industry would desire based on the thermal capacity of conventional furnace systems, and thus limits the productivity of the entire furnace system.

Applicant has found that this relationship can be improved. Specifically, by evacuating molten metal from the output conduit 160 of the exemplary side well subsystem 120 with the output flow inducer 170, a reduction or elimination in the counter-pressure (backflow pressure) at the output port 140 is achieved. This counter-pressure is a function of metal depth in the furnace bath and atmospheric pressure. Without the operation of the output flow inducer 170, counter-pressure is present from the metal head in the hearth 110 and/or the skimming well 128, which like the metal in the melting well 124, are acted upon equally by atmospheric pressure. The output flow inducer 170 may act to reduce the counter-pressure across a whole cross-sectional area of the output flow conduit 160, and such action may reduce counter-pressure across all or part of the volume of molten metal in the output flow conduit 160. Full or partial negation of the counter-pressure in the output flow conduit 160, and thus at the output port 140, enables atmospheric pressure to have greater effect on the metal in the melting well 124, without equal atmospheric counter-pressure from the furnace bath, thereby driving molten metal into the output conduit 160 and out of the melting well 124 at a relatively increased velocity and flow rate.

In this way, an additional value $H_A$ equal to atmospheric pressure drives fluid out of the melting well 124. This additional value $H_A$ acts on the column 142 in combination with the differential head $H_D$, which is equal to the velocity head of the column 142 and caused by the difference in height between the metal levels 144 and 146. The resultant pressure $H_T$ causing flow in the output conduit 160 is a sum of $H_A$ and $H_D$, less any residual counter-pressure that remains in the conduit 160 because of incomplete evacuation of the output conduit 160. In other words, in contrast to the input flow rate into the melting well 124, which is a function of a convection current of the metal from the hearth 110 to the pumping well 126 and of the motive force created by the input flow inducer 122, the output flow rate out of the melting well may be a function of atmospheric force acting on the differential column 142 since the action on the molten metal by the output flow inducer 170 counteracts back-pressure on the metal flow. The resulting head of molten metal in the melting well 124 is thus a metal head established by a differential height of the metal in the melting well 124 and in the reservoirs (e.g., the hearth 110, pumping well 126, and/or skimming well 128) plus atmospheric pressure on the molten metal in the melting well 124.

For example, the use of the output flow inducer 170 facilitates a vacuum-like condition or a partial vacuum-like condition in the output conduit 160, allowing atmospheric pressure $H_A$, such as up to approximately 14.7 psi, to be added to the metal head pressure $H_D$, where $H_D$ equals $H_2$ minus $H_1$. Assuming that a one foot head of aluminum generates approximately 1.18 psi and $H_D$ is 2.5 feet, the atmospheric pressure $H_A$ may add the equivalent of up to 12.5 feet of metal head pressure to the system, for a total of 12.5 feet+2.5 feet=15 feet. This may be six times the driving metal head in a side well subsystem of the same construction but without the output flow inducer 170. Notably, the additional head pressure does not necessarily change the metal level 144 in the melting well 124.

Velocity of the metal leaving the melting well 124 may be calculated using equation 1, where V is velocity, $K_1$ is a constant of orifice/turbulence losses in the system (assume in this example $K_1$ is 0.5), g is gravity, and H is the driving differential head.

$$V = K_1 *{}^2\sqrt{2gH} \qquad \text{Eq. 1}$$

Using the head pressure of 15 feet from the foregoing description, velocity of the molten metal leaving the melting well 124 according to equation 1 is 15.5 ft/sec $$\left(V = 0.5 * \sqrt[2]{2 * 32 \frac{\text{ft}}{\text{sec}^2} * 15 \text{ ft}}\right).$$

Flow rate (Q) of molten aluminum that would flow through the output conduit 160 may be determined by equation 2, where Q is flow in ft³/sec, A is the area of the output port 140 in ft², V is velocity in ft/sec, and $K_2$ is the friction and turbulence losses within the output flow conduit 160 (assume in this example $K_2$ is 0.7).

$$Q = AVK_2 \qquad \text{Eq. 2}$$

If the output port 140 is circular and has a diameter of 10 inches, flow rate may be calculated to be 6 ft³/sec (Q=0.55*15.5*0.7). At this flow rate, the furnace system 100 is capable of achieving 60,480 lbs/minute of aluminum flow, which is determined by multiplying the flow rate Q by the density of the metal (the density of molten aluminum is about 168 lbs/ft³) and multiplying by 60 sec/min.

This result may be contrasted with operation of the same system 100 but without the output flow inducer 170. As indicated, such a system only relies on the differential head $H_D$ to remove molten metal from the melting well 124. In this situation, the output velocity is 6.3 ft/sec $$\left(V = 0.5 * \sqrt[2]{2 * 32 \frac{\text{ft}}{\text{sec}^2} * 2.5 \text{ ft}}\right).$$

This leads to a flow rate of 2.4 ft³/sec, or 24,192 lbs/minute of aluminum flow. As will be appreciated, the output flow inducer 170 increases performance in this prophetic example by 250 percent.

Applicant has found that performance gains at this level cannot be achieved only by feeding molten metal into the melting well 124 with the input flow inducer 122 at a relatively increased rate. Rather, increasing flow into the melting well 124, such as by using a more productive inducer 122, may result only in a minimal increase in differential head in the melting well 124. Further, the differential head is limited by a physical height of the melting well 124, which is in turn limited by surrounding environmental constraints. Additionally, the side well subsystem 120 will reach an equilibrium point where the differential head may not be increased without causing backflow pressure on the input flow inducer 122 that counterbalances or opposes the input flow and pressure generated by the input flow inducer 122, regardless of its size or productivity.

Nevertheless, it will be appreciated that the disclosed increase in throughput may require resizing of one or more of the arch 130, input flow inducer 122, input conduit 132, input port 136, melting well 124, output port 140, output conduit 160, discharge opening 164, or arch 162 to appropriately coordinate with use of the output flow inducer 170. In summary, an exemplary furnace system 100 for melting stock metal 150, includes a main hearth 110 and a side well subsystem 120, which includes a melting well 124 disposed downstream of the main hearth 110 for receiving flow from the main hearth 100, an input flow inducer 122 disposed upstream of the melting well and downstream of the main hearth 110, and an output flow inducer 170 disposed downstream of the melting well 124 and upstream of the main hearth 110. The input flow inducer 122 drives molten metal into the melting well 124, thereby forming a differential metal head in the melting well 124. The output flow inducer 170 evacuates molten metal from an output conduit 160, thereby reducing counter-pressure at an output port 140 of the melting well 124 communicating with the output conduit 160. This allows atmospheric pressure to add to the differential metal head in the melting well 124, resulting in an increase in productivity of the side well subsystem 120 and of the furnace system 100 as a whole.

The exemplary reverb furnace system 100 may provide numerous advantages over conventional furnace systems. For example, greater molten metal flow and its contained superheat heat may be delivered to the melting well 124, allowing for a relatively greater quantity of stock metal 150 to be melted therein. As such, the overall throughput of the system for the recovery of aluminum is greatly increased by virtue of the improved circulation and thermal efficiency of the side well subsystem 120. Additionally, higher flow velocity in the output conduit 160 may slow, reduce, and/or eliminate build-up of oxides in the output conduit 160 and in the melting well 124.

Additionally, the exemplary reverb furnace system 100 may provide increased flexibility to a user as compared to a conventional furnace system. For example, the input flow inducer 122 may be a mechanical pump, an electromagnetic induction device (e.g., an electromagnetic stirrer, or an air or water-cooled electromagnetic pump or circulator), a mechanical pump, a permanent magnet device, gas jets, or any other device suitable for accomplishing the flow rates and pressures required. The melting well 124 may be of any suitable shape having top, middle, or bottom locations of input and output ports 136 and 140. The output flow inducer 170 may be an electromagnetic induction device (e.g., an electromagnetic stirrer, or an air or water-cooled electromagnetic pump or circulator), a mechanical pump, a permanent magnet pump, gas jets, or any suitable device for forcibly directing flow through the output conduit 160, so as to allow atmospheric pressure $H_A$ to operate on the column 142 in the melting well 124.

Figure 3:
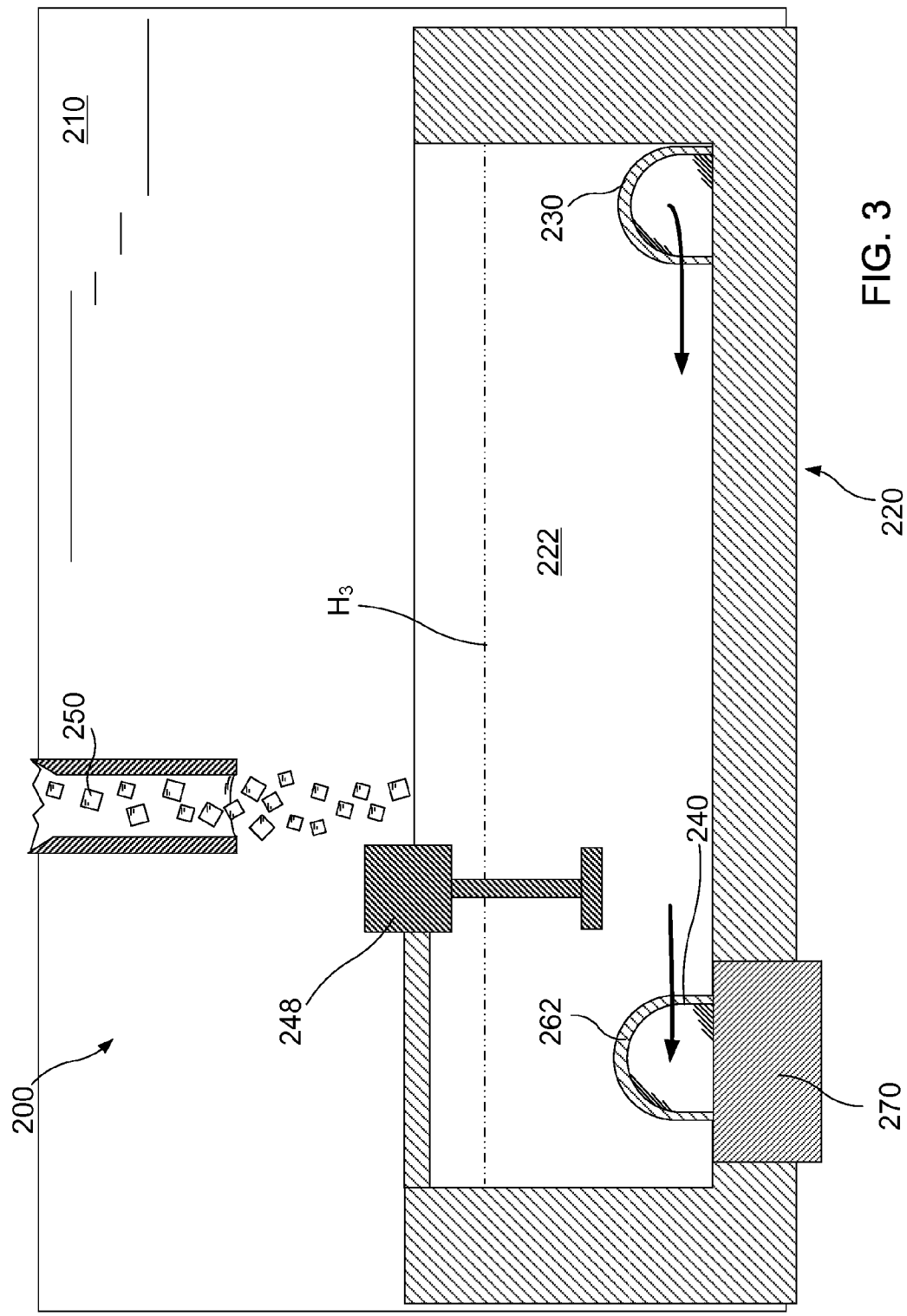
FIG. 3 is a partial front elevational view of another exemplary reverberatory furnace system that is shown in cross-section through a side well subsystem of the furnace system.

Turning now to FIG. 3, another exemplary furnace system 200 is illustrated, also according to the invention. The exemplary furnace system 200 may be used in place of the exemplary furnace system 100, and the discussion of the exemplary furnace system 200 may omit many features of the exemplary furnace system 200 that are similar to the exemplary furnace system 100. In addition, features of the exemplary furnace system 200 may be combined with those of the exemplary furnace system 100.

In contrast to the exemplary furnace system 100, the exemplary furnace system 200 is illustrated as including a side well subsystem 220 (also herein referred to as a side well) including a single utility well 222, although other side wells may be included upstream or downstream of the utility well 222. The utility well 222 is fluidly connected to a reservoir for molten metal, such as a main hearth 210. As shown, molten metal flows directly from the main hearth 210 into the utility well 222 via a submerged input arch 230 or other transfer flow conduit. The input arch 230 fluidly connects the main hearth 210 and the side well subsystem 220/utility well 222, and is disposed downstream of the main hearth 210 and upstream of the side well subsystem 220. Also as shown, another submerged arch, such as an output arch 262 or other transfer flow conduit, is disposed downstream of the side well subsystem 220 and upstream of the main hearth 210, enabling molten metal to flow directly from the side well subsystem 220 back into the main hearth 210. Each arch 230 and 262 may be of any suitable shape or size to enable fluid flow between the hearth 210 and the side well subsystem 220, and are expressly considered to be conduits. As shown, each arch 230 and 262 is submerged, such as located below the height of molten metal in the hearth 210, and below the height $H_3$ of metal in the side well subsystem 220, such that molten metal does not cascade between the hearth 210 and the side well subsystem 220, which could cause dross to form. The height of the molten metal in the main hearth 210 may be substantially the same as the height $H_3$ of molten metal in the side well subsystem.

The side well subsystem 220/utility well 22 may include a mixer 248 for causing submergence of scrap 250 deposited or charged therein. The mixer 248 may be configured to cause sufficient motive force in the side well subsystem 220/utility well 22 to submerge the scrap 250, and may be configured to provide no or minimal motive force for circulating molten metal through the furnace system 200.

As depicted, no input flow inducer may be present to move fluid from the main hearth 210 into the side well subsystem 220. An output flow inducer 270 is disposed adjacent and/or in the output arch 262 to evacuate molten metal from the output arch 262, and thus to move molten metal from the side well subsystem 220 into the main hearth 220. The output flow inducer 270 may be configured to reduce the counter-pressure at an output port 240 (of the of the side well subsystem 220 communicating with the output arch 262). More specifically, the output flow inducer 270 may be configured to reduce the counter-pressure across a cross-sectional area of the output arch 262, the cross-sectional area being transverse to the direction of flow through the output arch 262 and adjacent an operative component of the output flow inducer 270 for providing a motive force to molten metal in the output arch 262. The action of the output flow inducer 270 may reduce counter-pressure across all or part of the volume of molten metal in the output arch 262. The cross-sectional area of the output arch 262 may be a reduced area as compared to a cross-sectional area through the input arch 230 transverse a direction of flow through the input arch 230. It will be appreciated that an input flow inducer may alternatively be present, but may be used as a primer only to begin fluid flow through the furnace system 200 upon initial filling of the system 200.

Full or partial negation of the counter-pressure in the output arch 262, and thus at an output port 240, may enable molten metal to flow from the side well subsystem 220 to the main hearth 210 without the force of a differential head in the side well subsystem 220 (such differential head being in relation to a bath level in the main hearth 210 or other adjacent well). Rather, there may be no substantial difference in bath level between the main hearth 210 and the side well subsystem 220, due in part to an input flow inducer not being present to move flow of molten metal into the utility well 222 and creating a differential head in the utility well 222. In this way, a value $H_A$ equal to atmospheric pressure may act on fluid in the utility well 222 and drive fluid out of the utility well 222 without a differential head value $H_D$ also acting on the fluid in the utility well 222. Therefore, the output flow inducer 270 may negate back pressure or counter-pressure in the output arch 262 and at the output port 240 to a degree that the atmospheric pressure $H_A$ is the driving force to flow molten metal downstream of the side well subsystem 220/utility well 222, through the output arch 262, and through the furnace system 200.

Figure 4:
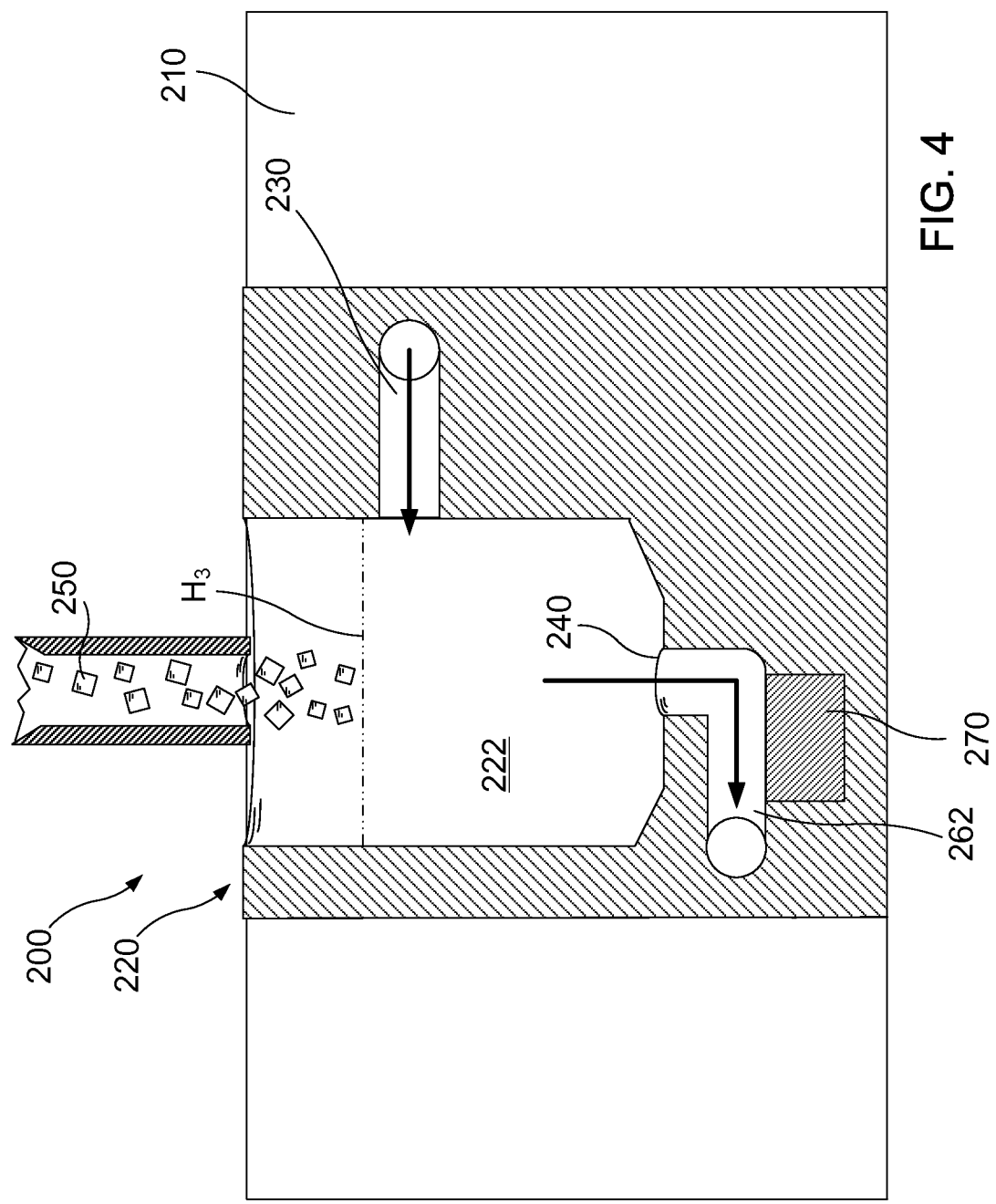
FIG. 4 is a partial front elevational view of yet another exemplary reverberatory furnace system that is shown in cross-section through a side well subsystem of the furnace system.

FIG. 4 illustrates an embodiment of a side well subsystem 220 that operates on the same principles as the embodiment described in connection with FIG. 3, but with a structural configuration to promote submerging of solid metal pieces 250. In one embodiment, a mixing action is created by the configuration of utility well 222 and its relationship with the input conduit 230 and the output conduit 262, which both lead to the main hearth 210 in the illustrated embodiment. A side well upstream of the utility well 222 may be present and/or downstream of the utility well 222 may be present. In this arrangement, a mixing action as described in connection with FIG. 2 is created. Molten melt from input conduit 230 enters the utility well 222 (also referred to as a mixing well) below the operational height $H_3$ of molten metal. Additionally, port 240 is located below the operational height $H_3$ of molten metal.

Although certain embodiments have been shown and described, it is understood that equivalents and modifications falling within the scope of the appended claims will occur to others who are skilled in the art upon the reading and understanding of this specification.

What is claimed is:

1. A furnace system for melting metal, comprising:
   a reservoir for a molten metal bath;
   an input flow inducer;
   a melting well configured to receive molten metal from the reservoir at an input port of the melting well under motive force applied to the molten metal by the input flow inducer, the melting well further configured to receive solid metal pieces, the solid metal pieces at least partially melting in the molten metal in the melting well, the melting well having an output port through which molten metal exits the melting well;
   an output flow conduit having a first end opening to and fluidly coupled to the melting well at the output port of the melting well and the output flow conduit having a second end terminating at a discharge opening of the output flow conduit through which molten metal is discharged from the output flow conduit into the molten metal bath, the discharge opening of the output flow conduit upstream of a point in the furnace system from which molten metal is tapped or recovered, and the output flow conduit establishing an enclosed passage between the output port of the melting well and discharge opening of the output flow conduit; and
   an output flow inducer configured to act on and apply motive force to molten metal located in the output flow conduit between the output port of the melting well and the discharge opening of the output flow conduit, the motive force resulting from an evacuating action in the output flow conduit established by the output flow inducer.

2. The furnace system of claim 1, wherein flow rate of the molten metal in the output conduit is a function of atmospheric pressure on the molten metal in the melting well and of a differential head of metal in the melting well established by a differential height of the metal in the melting well and in the reservoir.

3. The furnace system of claim 1, wherein the output flow inducer reduces counter-pressure at the output port of the melting well.

4. The furnace system of claim 1, wherein the reservoir comprises at least one of a main hearth of the system in which heat energy is added to the molten metal or a pumping well at which the motive force is applied by the input flow inducer.

5. The furnace system of claim 1, wherein the input and output flow inducers are controllable to vary flow rate of molten metal in the furnace system.

6. The furnace system of claim 1, wherein the output flow inducer comprises an electromagnetic induction device.

7. The furnace system of claim 1, wherein the output flow inducer comprises at least one of a mechanical pump, a permanent magnet device, or gas jets.

8. The furnace system of claim 1, wherein the input flow inducer comprises at least one of an electromagnetic induction device, a mechanical pump, a permanent magnet device, or gas jets.

9. The furnace system of claim 1, wherein the metal bath includes aluminum, and wherein the melting well is configured to receive solid metal pieces including aluminum.

10. A furnace system for melting metal, comprising:
    a reservoir for a molten metal bath;
    a side well configured to receive molten metal from the reservoir at an input port of the side well, the side well further configured to receive solid metal pieces, the solid metal pieces at least partially melting in the molten metal in the side well, the side well having an output port through which molten metal exits the side well and flows toward the reservoir;
    an output flow conduit having a first end opening to and fluidly coupled to the side well at the output port of the side well and the output flow conduit having a second end terminating at a discharge opening of the output flow conduit through which molten metal is discharged from the output flow conduit into the molten metal bath, the discharge opening of the output flow conduit upstream of a point in the furnace system from which molten metal is tapped or recovered, and the output flow conduit establishing an enclosed passage between the output port of the side well and discharge opening of the output flow conduit; and
    an output flow inducer configured to reduce counter-pressure at the output port of the side well by evacuation of molten metal from the output flow conduit allowing atmospheric pressure to drive a molten metal flow from the side well via the output flow conduit, the output flow inducer acting on molten metal in the output flow conduit between the output port of the side well and the discharge opening of the output flow conduit.

11. The furnace system of claim 10, wherein the output flow conduit provides a path for molten metal from the side well directly to the reservoir.

12. The furnace system of claim 10, further including an input flow conduit fluidly coupled between the side well and the reservoir, wherein the input flow conduit provides a path for molten metal from the reservoir directly to the side well.

13. The furnace system of claim 10, wherein the reservoir is a main hearth of the system in which heat energy is added to the molten metal.

14. The furnace system of claim 10, wherein the output flow inducer is further configured to reduce counter-pressure on a cross-sectional area of the output flow conduit, the cross-sectional area being transverse to the direction of flow through the output flow conduit.

15. The furnace system of claim 14, further including an input flow conduit fluidly coupled between the side well and the reservoir, wherein the cross-sectional area of the output flow conduit is a reduced area as compared to a cross-sectional area through the input flow conduit transverse a direction of flow through the input flow conduit.

16. The furnace system of claim 14, wherein the output flow inducer has an operative component for providing a motive force to molten metal in the output flow conduit, and wherein the operative component is located adjacent the cross-sectional area.

17. The furnace system of claim 10, wherein the output flow conduit is submerged below a height of molten metal in each of the side well and the reservoir.

18. The furnace system of claim 12, wherein the input flow conduit is submerged below a height of molten metal in each of the side well and the reservoir.

* * * * *